April 26, 1949. W. T. WHITE ET AL 2,468,149
LIMIT STOP SYSTEM FOR REVERSIBLE ELECTRIC MOTORS
Filed Aug. 22, 1944

INVENTORS
WALTER T. WHITE AND
BY DONALD H. COURTER
ATTORNEY

Patented Apr. 26, 1949

2,468,149

UNITED STATES PATENT OFFICE 2,468,149

LIMIT STOP SYSTEM FOR REVERSIBLE ELECTRIC MOTORS

Walter Thomas White and Donald H. Courter, Hempstead, N. Y., assignors to The Sperry Corporation, a corporation of Delaware Application August 22, 1944, Serial No. 550,534

4 Claims. (Cl. 318—258)

1

This invention relates generally to limit stops for motors in which the direction and speed of rotation is governed by a control signal and particularly, concerns improved limit stop apparatus for motor control systems in which electronic control circuits govern the direction and speed of the motor.

It is a major object of this invention to provide limit stop apparatus which is operative to arrest rotation of the motor when a limit condition is reached and permits the motor to drive itself out of the limit condition.

Another object of the invention is to provide limit stop apparatus which controls dynamic braking mechanism when a limit condition is reached and removes the dynamic braking effect to permit the motor to drive itself out of the limit condition.

A further object of the invention is to provide limit stop apparatus in which operation of a brake to retard the speed of the motor depends upon the error signal controlling the speed of the motor as well as the approach of the motor to a limit condition, said error signal being increased and therefore the braking effect increased as the motor slows down.

A more specific object of the invention is to provide limit stop apparatus for a motor having its effective field current controlled by a balanced amplifier circuit in which operation of the motor stop apparatus depends upon the current in said amplifier as well as upon the existence of the limit condition.

Another specific object of the invention is to provide limit stop apparatus with a variable speed motor having its armature excited by a generator, the effective field current of which is controlled by a balanced amplifier circuit and the operation of the motor stop apparatus depends upon the amplifier current as well as the approach of the motor to a limit condition.

Figure 1:
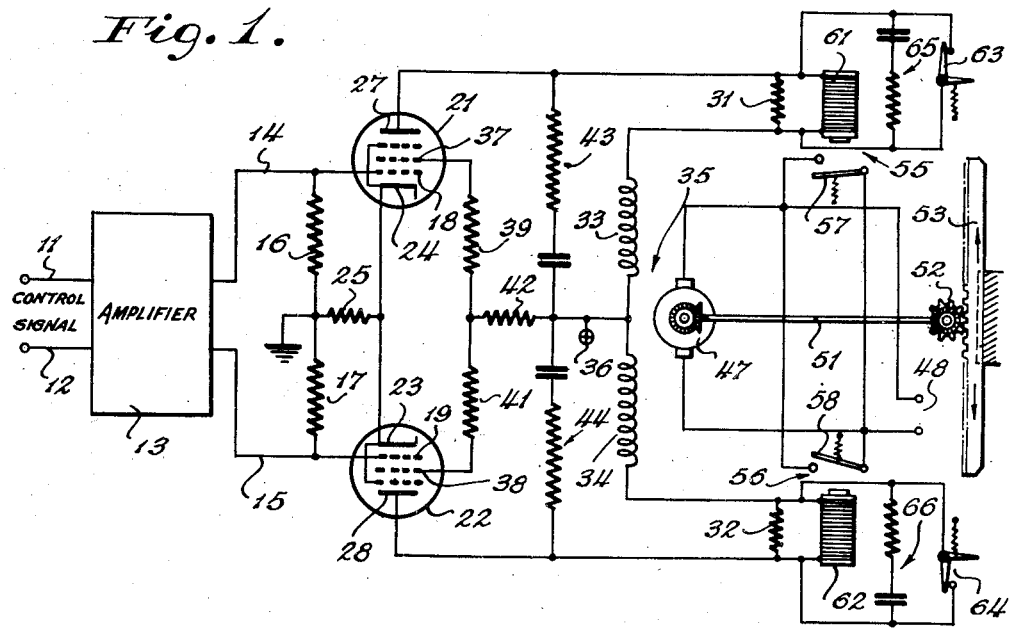
Figure 2:
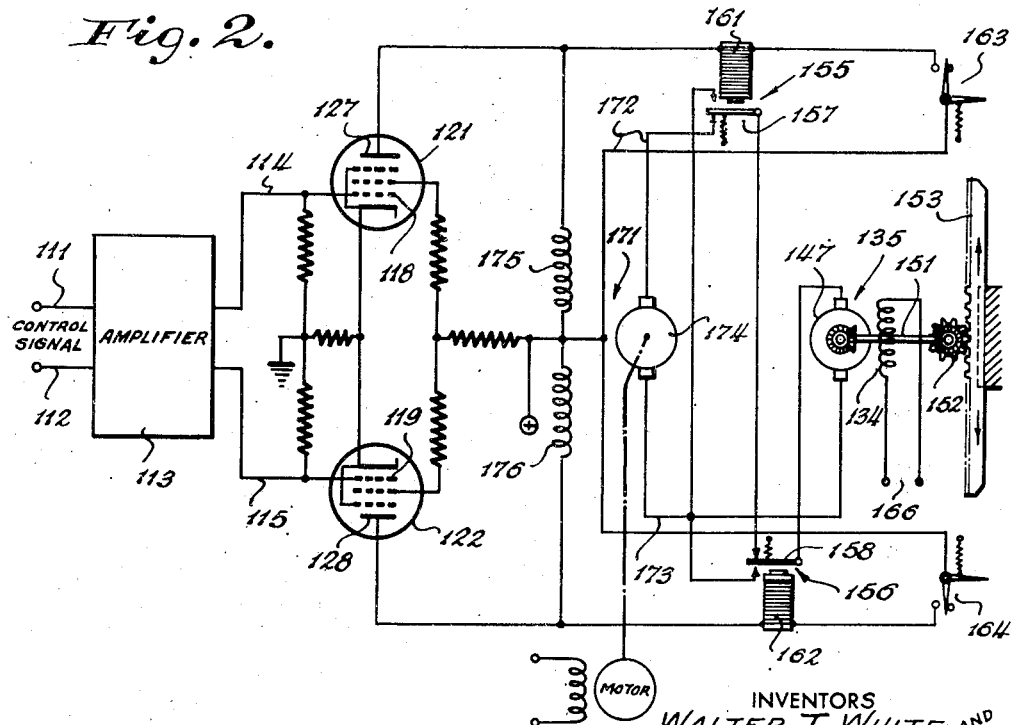

Other more specific objects of the invention will become apparent from the following specification taken together with the accompanying drawings, wherein:

Fig. 1 is a schematic wiring diagram of a motor control system embodying the limit stop apparatus forming the present invention; and Fig. 2 is a schematic wiring diagram of a modified motor control system embodying the limit stop apparatus forming the present invention.

In accordance with the invention, the motor being controlled is provided with a field control circuit having a plurality of normally inoperative relays which are adapted to control short-circuiting switches for short-circuiting the armature of the motor to produce dynamic braking when a limit condition is reached. Operation of the short-circuiting switches is controlled jointly by a limit switch that may be actuated either by the motor or some object driven by the motor when a limit condition is reached and also, according to a control signal which controls a circuit governing the direction and speed of rotation of the motor.

Preferably, the direction and speed of rotation of the motor is controlled by a balanced amplifier circuit in which the space currents through opposite sides of the circuit are differentially controlled by and according to the direction and magnitude of a control signal. Each side of the balanced amplifier includes an electromagnetic coil of a relay for operating the switches for short-circuiting the armature to stop the motor. These coils are shunted by a pair of normally closed limit switches that are respectively opened when the motor drives into a limit condition.

When either of the limit switches is opened, its respective electromagnetic coil is operatively connected into one side of the balanced amplifier whereby, if the space current in that side of the amplifier is sufficient, a relay is operated to short-circuit the armature and thereby stop the motor. When the control signal falls below a predetermined level, thereby reducing the space current in the side of the amplifier containing the operative relay, the relay becomes deenergized, the short-circuit of the armature is removed and the armature is energized to permit rotation of the motor. This permits the motor to respond to a reversal of the error signal to drive itself out of the limit condition, although the limit switch remains open until the limit condition is removed.

In Fig. 1, the invention is shown as incorporated in a motor control system which responds to a control or error signal for controlling the effective field current of a motor. A suitable control signal as from a remote positional control or a conventional transmission system of the "Selsyn," "Telegon" or "Autosyn" type may be supplied as by leads 11 and 12 to a suitable amplifier 13, having a balanced output as represented by leads 14 and 15 which apply the amplified control signal differentially across grid resistors 16 and 17 connecting control grids 18 and 19 of electron discharge tubes 21 and 22 respectively to ground. The electron discharge tubes 21 and 22 are shown as pentodes connected in a conventional balanced power amplifier circuit having their cathodes 23 and 24 connected through a common cathode resistor 25 to ground.

Plates 27 and 28 of the tubes 21 and 22 are connected through resistors 31 and 32 and opposing coils 33 and 34, forming the field of a motor 35, to a source of positive potential 36. Screen grids 37 and 38 are connected in a conventional manner through dropping resistors 39 and 41 as well as resistor 42 to the same source of positive potential 36. In order to protect the field coils 33 and 34 from damage due to excessive voltages, suitable resistance condenser protective networks 43 and 44 are connected across the respective field coils.

In the apparatus thus far described, the amplifier 13 together with tubes 21 and 22 form a control circuit for the motor 35 in which the control signal is applied differentially to grids 18 and 19 for differentially controlling the space currents drawn by the tubes 21 and 22 according to the direction and magnitude of the control signal. The currents drawn by the tubes 21 and 22 determine the currents through opposite field windings 33 and 34, so that the effective field of the motor 35 depends upon the difference between the currents drawn by the tubes 21 and 22. In this manner, the direction and speed of armature 47 of the motor 35, which is connected to a constant current source 48, depends upon the direction and magnitude of the control signal. The armature 47 is shown as driving through shaft 51 and pinion 52 to translate a rack 53 which represents any load that may be driven by the motor 35.

The motor may be operated with both field windings 33 and 34 normally energized and their respective currents differentially adjusted in response to the control signal. If desired, the control signal may cut off one of the tubes 21 or 22 and increase the current in the other. In either mode of operation, the tube conducting the greater current is the driving tube controlling the power of the motor and determining its direction of rotation.

In order to retard the speed of the motor when a limit condition is reached, provision is made for dynamically braking the motor by short-circuiting the armature 47. For this purpose, a pair of relays, indicated generally at 55 and 56, have their normally opened switch contacts 57 and 58 connected to short-circuit the armature 47 when the contacts are closed. Closure of the contacts 57 and 58 is controlled by electromagnetic relay coils 61 and 62 that are connected across resistors 31 and 32 to be energized by the space currents of the tubes 21 and 22 respectively.

A pair of normally closed limit switches 63 and 64 shunt the windings 61 and 62 to render them normally inoperative. When the load as represented by rack 53 reaches a limit condition, one of the limit switches 63 or 64 is opened, depending upon the direction in which the load is driven, as determined by the direction of the control signal, into the limit condition. When the rack 53 drives upward to open switch 63, relay coil 61 will cause switch contact 57 to short-circuit the armature 47, thereby inducing dynamic braking of the motor 35. This short-circuit of the armature 47 will continue as long as a current drawn by the tube 21 is sufficient to energize coil 61 of the relay 55.

In the case of a positional or follow-up control signal, the short-circuit across armature 47 will retard the motor 35, thereby increasing the error or control signal. This will cause an increase of the field current in an effort to accelerate the motor, but the dynamic braking will become more effective with the increased field so the motor will be rapidly decelerated to a stop.

If the control signal falls below a predetermined magnitude, as when it is reversed to cause operation of the motor in the opposite direction, relay 55 will become deenergized due to the reduced space current in tube 21. The contact 57 will be opened to restore the armature of motor 35 in circuit with current leads 48, although the limit switch 63 remains open. Opening of the short-circuiting switch 57 permits the reversal of the control signal to cause the motor 35 to rotate in the opposite direction, thereby driving itself out of the limit condition and limit switch 63 will subsequently close to short coil 61 and again render the relay inoperative.

Similarly, as the load 53 reaches its lower limit, limit switch 64 is opened to render relay coil 62 operative so it is energized by the space current of the tube 22, thereby closing switch contact 58 to stop rotation of the motor 35 by short-circuiting the armature 47. As long as the control signal maintains a predetermined current in the tube 22, relay 56 will remain energized and the armature of the motor will be short-circuited. Should the error signal again reverse, relay 62 will become deenergized, even though limit switch 64 remains open, and the motor will be permitted to drive itself out of the limit condition.

The relays 55 and 56 may be selected to operate on any desired current, and the values of resistors 31 and 32 may be suitably proportioned to the coils 61 and 62 so the relays 55 and 56 will operate when the space currents of tubes 21 and 22 reach a selected level. In order to prevent damage to the limit switches 63 and 64, which normally carry the entire space currents of tubes 21 and 22, suitable quench networks 65 and 66 may be connected across the switches 63 and 64.

In the modified form of the invention shown in Fig. 2, a control signal, as represented by leads 111 and 112, is amplified by amplifier 113, having its output, as represented by leads 114 and 115, applied differentially to control grids 118 and 119 of electron discharge tubes 121 and 122 that are arranged in a conventional balanced power amplifier circuit similar to that described in connection with Fig. 1.

In this modified form of the invention, armature 147 of motor 135 drives through shaft 151 and pinion 152 to translate rack 153. The motor 135 has its field 134 energized from a suitable constant source 166 and its armature connected through relay switches 157 and 158 of relays 155 and 156 to the output of a generator 171 as represented by leads 172 and 173 from armature 174.

The generator 171 has its opposing field coils 175 and 176 connected to plates 127 and 128 in series with the space paths of discharge tubes 121 and 122 so the effective field of the generator 171 is determined by the difference between the space currents of the tubes 121 and 122. In this manner the output voltage of the generator 171 which is applied to control the speed of the motor 135, is determined by the direction and magnitude of the control signal that is amplified and applied differentially to control grids 118 and 119.

Switch contacts 157 and 158 of the relays 155 and 156 may be operated by their respective coils 161 and 162 to short circuit the motor armature 147 thereby applying dynamic braking to stop the motor. The relay coils 161 and 162 are voltage operated and are connected in parallel with the respective field windings 175 and 176 of the generator 171, so operation of the coils depends upon the space currents of the tubes 121 and 122 respectively as determined by the direction and magnitude of the control signal. Normally open limit switches 163 and 164 are connected in series with the relay coils 161 and 162 and are arranged to be operated when the motor 135 drives the rack load 153 to a limit condition.

Assuming the rack 153 is driven into its upper limit, limit switch 163 will be closed rendering coil 161 operative by the space current of the driving tube 121 to switch relay contact 157 to short circuit the motor armature 147. The relay contacts 157 and 158 are so arranged that operation of either will not only short-circuit the armature 147, but will open the circuit of leads 172 and 173 to prevent short-circuiting the generator armature 174.

If the space current in the driving tube 121 falls below a predetermined level due to a reduction in magnitude of the control signal, the relay coil 161 will become deenergized and switch contact 157 will return to its normal position. This closes the circuit of motor armature 147 and reconnects it to the output of the generator 171, so reversal of the control signal will permit the motor 135 to rotate in the opposite direction, thereby driving itself out of the limit condition even though switch 163 remains closed.

Although the invention has been described as applied to particular motor control systems and in its preferred form utilizes dynamic braking for stopping the controlled motor, it is contemplated that the improved limit stop apparatus forming the subject matter of this invention may be incorporated in other motor control systems and utilize other specific forms of apparatus.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Limit stop apparatus for a reversible motor, having separately excited opposed field windings comprising a control circuit for each winding oppositely responsive to the direction and magnitude of a control signal to control the speed and direction of said motor, a relay in each circuit, a pair of normally open short-circuiting switches in the armature circuit of said motor controlled respectively by said relays, a limit switch arranged to be actuated by the approach of the limit condition of said motor in each direction, each limit switch operating to actuate one of said relays to close its short-circuiting switch while leaving the energized field in circuit with the energizing signal whereby said motor is dynamically braked until said control signal substantially disappears or reverses.

2. Limit stop apparatus as claimed in claim 1, wherein the separate circuits include separate electron tubes, the output of which differentially excites said field windings in opposite directions.

3. In a positional control system in which the control signal varies with the error, a reversible error signal, a reversible servo motor, having opposed field windings differentially controlled from said signal in accordance with its sign and magnitude, a relay in circuit with each winding, a pair of normally open short-circuiting switches in the armature circuit of said motor controlled respectively by said relays, a limit switch arranged to be actuated by the approach of the limit condition of said motor in each direction, each limit switch operating to actuate one of said relays to close its short-circuiting switch while leaving the energized field winding in circuit with the energizing signal whereby dynamic braking is progressively increased as the motor is slowed down.

4. In a motor control system, a motor having dual opposed field windings and a separately excited armature, a pair of electron discharge devices arranged in a balanced circuit to differentially excite the two field windings according to the magnitude and sign of the control signal for controlling the direction and speed of the motor, a relay in the output of each device, a short-circuiting switch controlled by each of said relays for short-circuiting the armature of said motor, and a limit stop switch at each limit of motion of the motor, one controlling each relay, whereby, if the control signal reverses, the motor drives itself away from the limiting position

WALTER THOMAS WHITE.
DONALD H. COURTER.

REFERENCES CITED

The following references are of record in the file of this patent:

UNITED STATES PATENTS

| Number | Name | Date |
|---|---|---|
| Re. 20,418 | Howe | June 22, 1937 |
| 696,017 | Dutton | Mar. 25, 1902 |
| 1,798,592 | Davis | Mar. 31, 1931 |
| 2,183,725 | Seeley | Dec. 19, 1929 |
| 2,252,053 | Watson | Aug. 12, 1941 |
| 2,287,002 | Moseley | June 16, 1942 |
| 2,359,308 | Grabau | Oct. 3, 1944 |

FOREIGN PATENTS

| Number | Country | Date |
|---|---|---|
| 755,455 | France | Sept. 11, 1933 |